Feb. 9, 1954          J. T. McNANEY          2,668,940
                        CONVERTER
Filed Jan. 31, 1950                      4 Sheets-Sheet 1

Inventor
JOSEPH T. McNANEY

By Killman and Kerst
            Attorney

Feb. 9, 1954 — J. T. McNANEY — 2,668,940
CONVERTER
Filed Jan. 31, 1950 — 4 Sheets-Sheet 2

Inventor
JOSEPH T. McNANEY
By Killman and Kerst
Attorney

Feb. 9, 1954            J. T. McNANEY            2,668,940
CONVERTER

Filed Jan. 31, 1950            4 Sheets-Sheet 3

Inventor
JOSEPH T. McNANEY

By Killman and Keist
Attorney

Feb. 9, 1954

J. T. McNANEY 2,668,940

CONVERTER

Filed Jan. 31, 1950

Inventor
JOSEPH T. McNANEY

By Killman and Kerst
Attorney

Patented Feb. 9, 1954

2,668,940

UNITED STATES PATENT OFFICE 2,668,940

CONVERTER

Joseph T. McNaney, San Diego, Calif., assignor to Bendix Aviation Corporation, Towson, Md., a corporation of Delaware Application January 31, 1950, Serial No. 141,429

14 Claims. (Cl. 321—44)

1

This invention relates to a means for converting a direct current, or a difference between similar characteristics of a pair of voltages, into an alternating current, the magnitude of which is a function of the value of said direct current or said difference. An important field of use for such a device is found in the amplification of low level outputs of thermocouples, strain gauges, discriminator circuits, photoelectric cells and other direct current sources of a similar nature. It also has application for such use as a frequency converter for converting an alternating current into a lower frequency alternating current of equal amplitude to the first. This feature finds application, for example, in obtaining a 60 cycle output voltage which is proportional to a 400 cycle phase difference.

Considerable effort has been devoted in the past to the apparently simple problem of amplifying low level direct current outputs of the types of sources mentioned above. Because of the instability of direct current vacuum tube amplifiers, it has been found that the best approach to the problem is to convert low potential direct current into alternating current for further amplification. By means of mechanical and electrical modulators of various current types the low potential direct current outputs of these sources have been converted to alternating currents.

The devices used for these conversions have, however, all been subject to one or more serious drawbacks, which operate to limit the range of their usefulness or the accuracy of their results. Among these defects are acceleration inaccuracies or positional errors, sensitivity to supply voltage or temperature variations, excessive operational time lags and mechanical limitations.

One of the objects of the present invention is the provision of a converter which has the stability of a mechanical chopper and yet is electronic in nature, thus avoiding the mechanical limitations of the chopper.

It is another object to provide a converter which is more dependable and has a longer life than a mechanical chopper.

It is another object to provide a converter which is much less expensive than a mechanical chopper.

It is still another object to provide a converter which does not depend, for the action of conversion, upon the gain characteristics of a vacuum tube, which characteristics are subject to change with aging, but rather utilizes tubes to provide a switching action in which gain characteristics do not appreciably affect the result.

2

The objects and advantages of the invention are realized by a converter in which a respective conductive path is provided for each of the input voltages, each of said paths being shunted by a respective diode, a modulating voltage being applied across a third diode, all of said diodes having a common or directly connected cathodes and a common cathode resistor. This results in the generation in each path of a square wave output voltage having the frequency of the modulating voltage and an amplitude related to the direct current source. The output voltages may be differentially combined as in the usual converter circuit to provide zero output when the two inputs are equal.

Referring now to the drawings.

Figure 1:
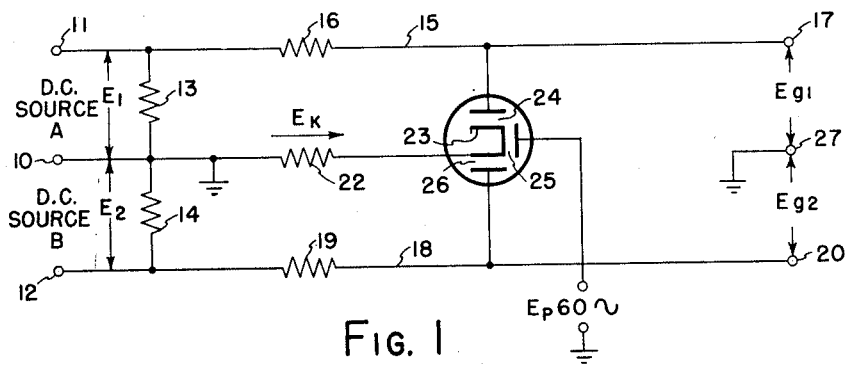
Fig. 1 is a schematic diagram of a circuit embodying the invention.

The circuit illustrated in Fig. 1 is a basic embodiment of the invention. The voltages to be compared are the voltage $E_1$ from the source A which is applied at the terminals 10, 11 across the resistor 13 and the voltage $E_2$ from the source B, applied at the terminals 10, 12 across the resistor 14. The terminal 11 is connected by a conductor 15 through a resistor 16 to an output terminal 17. The terminal 12 is connected by a conductor 18 through resistor 19 to an output terminal 20.

The input terminal 10 is grounded and is connected through a resistor 22 to a cathode 23 that is common to three diodes 24, 25 and 26. The anode of diode 24 is connected to output terminal 17 and the anode of the diode 26 is connected to output terminal 20. The anode of diode 25 is connected to a source of modulating voltage $E_P$ which may be, for example, at a frequency of 60 cycles.

The three diodes 24, 25 and 26 are shown as contained in a single envelope. They are shown in this manner to avoid complicating the drawing, although no such composite tube is now known to be available. The invention may be as well realized by diodes in separate envelopes with directly connected cathodes. A duplex-diode triode tube of the 6BF6 type, with the triode grid tied to the anode, operates in the same manner and has been used successfully in connection with the invention.

Resistors 16 and 19 should have a high value of resistance. Resistors having a value of one megohm have been used for this purpose. Common to the output terminals 17 and 20 is a grounded terminal 27. Output voltages $Eg1$ and $Eg2$ are available for differential measurement by conventional methods across terminals 17, 27 and 26, 27 respectively.

The operation of the circuit of Fig. 1 resembles that of the mechanical chopper to the extent that it interrupts the direct current input voltages at a predetermined rate. The output is a square wave at the modulating frequency which, by reducing the modulating potential to a suitable value, may be made to resemble the output of a half-wave rectifier.

Figure 1A:
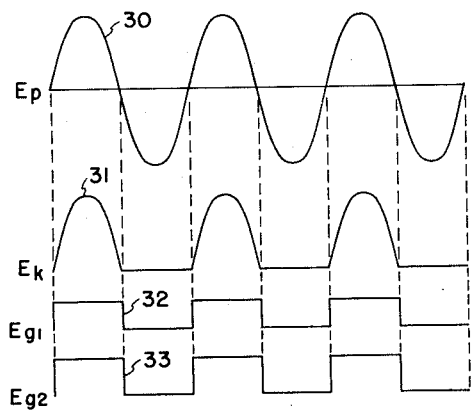
Fig. 1a is a group of related curves depicting voltage wave forms at various points of the circuit of Fig. 1.

The voltage waveforms existing at various points in the circuit are shown in Fig. 1a. The curve 30 represents the sinusoidal 60 cycle voltage $E_P$ applied to the anode of diode 25. Current flows in this diode during the positive peaks of the voltage $E_P$, setting up a voltage drop across the resistor 22 and as a consequence producing the rectified voltage waveform 31 on the cathode 23. The resistance of resistor 22 is low, being only sufficient to cut-off diodes 24 and 26, when current is flowing in diode 25.

No current flows in the diodes 24, 26 during the positive excursions of the voltage $E_K$ and the voltages $Eg1$ and $Eg2$ across the output terminals are at substantially the same levels as the voltages $E_1$ and $E_2$ across the input terminals as indicated by the curves 32 and 33. During the negative excursions of the voltage $E_P$ current flows in the diodes 24 and 26. The current flowing in these circuits is small because of the high value of resistance involved. The resistance 22 plus the diode plate resistance is small compared to resistances 16 and 19, so that the output voltages $Eg1$ and $Eg2$ are effectively at zero during the negative halves of the modulating potential.

Figure 1B:
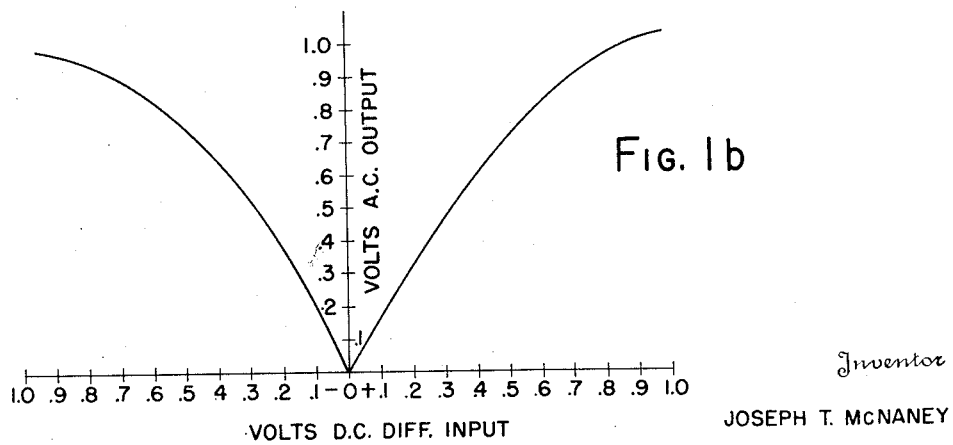
Fig. 1b is a graph showing the response characteristic of the circuit of Fig. 1.

Fig. 1b shows a typical response curve for a circuit of the type shown in Fig. 1, as well as the other circuits illustrated.

Figure 2:
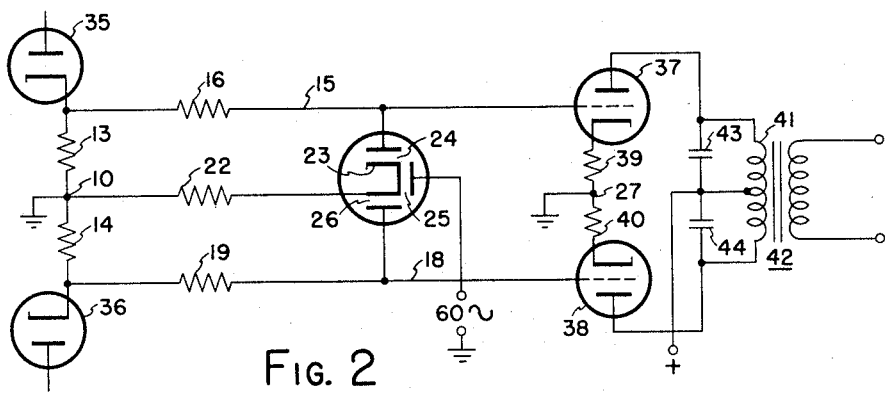
Fig. 2 is a schematic diagram of the circuit of Fig. 1 showing it as deriving its input voltages from the diodes of a discriminator circuit and having its output voltages differentially combined.

Fig. 2 illustrates an application of the circuit of Fig. 1 to the differential measurement of the outputs of the diodes of a conventional discriminator. The diodes are indicated as 35 and 36. The conductors 15 and 18 are connected to the control grids of a pair of triodes 37 and 38, the cathodes of which are grounded at the terminal 27 through resistors 39 and 40 respectively. The anodes are connected to respective terminals of primary 41 of transformer 42. The primary is center tapped to B+ and tuned by a pair of condensers 43 and 44 each of which is connected to a respective terminal of the primary coil and to its center tap, thus forming a resonant circuit at the modulation frequency. These circuits convert the square wave voltages $Eg1$ and $Eg2$ into sinusoidal voltages, the difference of which is coupled to a utilization means by the transformer 42.

Figure 3:
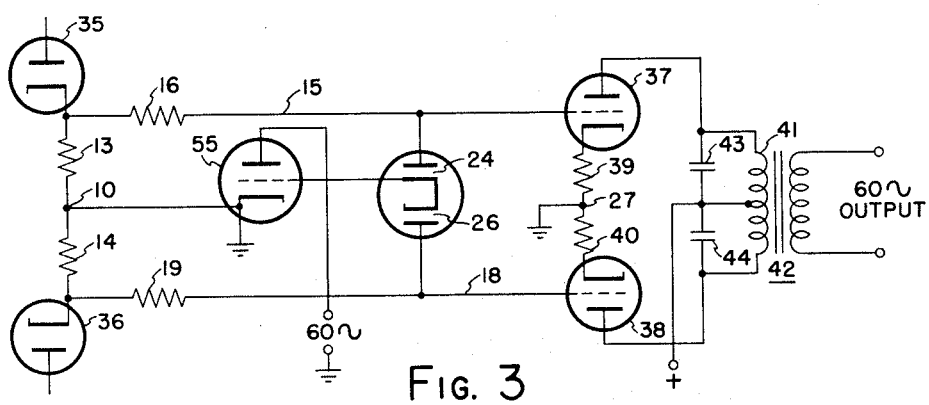
Fig. 3 is a schematic diagram of a modification of the circuit of Fig. 2, with the modulating voltage applied to a triode instead of a diode.

The circuit of Fig. 3 resembles that of Fig. 2. The diodes 24 and 26 are tied to the control grids of tubes 37 and 38 as before, but in place of the third diode a triode 55 is provided, to the anode of which the modulation voltage is applied. The control grid is directly connected to the common cathode of the diodes 24 and 26 and the cathode of the triode is grounded.

In the operation of this circuit, the control grid and cathode of the triode 55 function as a resistance the value of which is varied as a function of the modulation voltage. Thus in Fig. 2 a fixed resistor 22 is present in the cathode circuit of the diodes, the current flow through the resistor being varied to vary the voltage on the common cathode, whereas in Fig. 3 the effective resistance of the cathode circuit is varied. The circuit of Fig. 3 has the advantage that the diodes 24 and 26 serve to isolate the control grids of the triodes 37 and 38 and the common control of the diodes through the control grid and cathode of tube 55 prevent changes in the characteristics of that tube from affecting the output.

Figure 4:
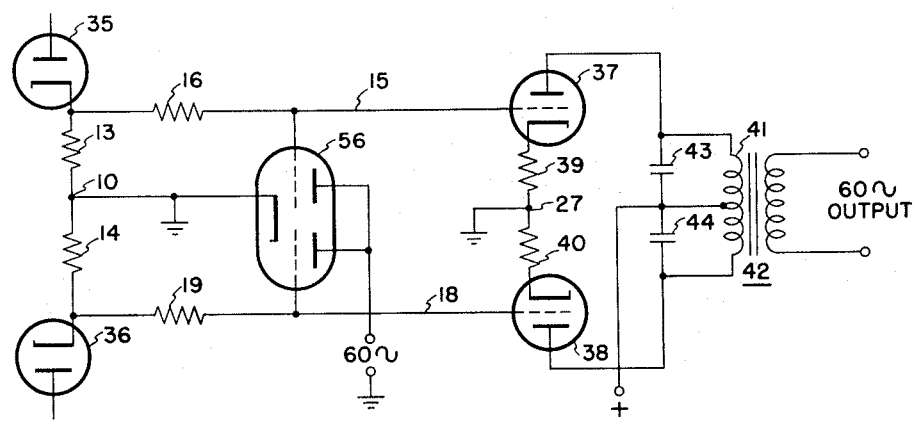
Fig. 4 is a schematic diagram of another modification of the circuit of Fig. 2 with a pair of triodes replacing the three diodes of that circuit.

Fig. 4 illustrates a way in which the three diodes of Fig. 2 may be replaced by a duplex-triode such as 56. The control grids of this tube are tied to the respective control grids of tubes 37 and 38. The common cathode is grounded and the two anodes are tied together. Modulation voltage is applied to the anode to simultaneously vary the resistance between the respective control electrodes of the duplex-triode and the common cathode.

Figure 5:
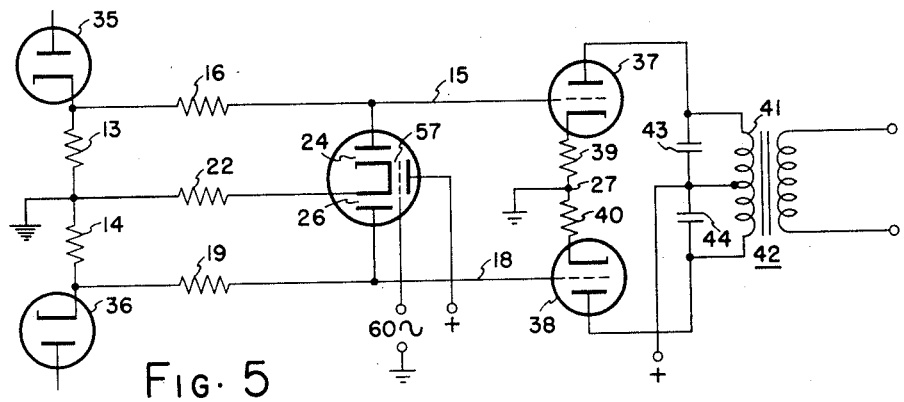
Fig. 5 is a schematic diagram of a circuit similar to that of Fig. 2, except that one of the diodes of that figure is replaced by a triode to the control grid of which a modulation voltage is applied.

In the circuit of Fig. 5 the diode 25 has been replaced by a triode 57 to the control grid of which the modulation is applied. By this means a smaller value of modulating potential may be employed. The operation is almost identical with Fig. 2.

Figure 6:
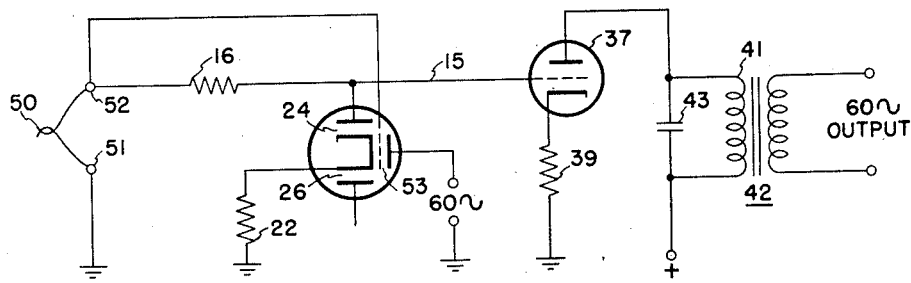
Fig. 6 is a schematic diagram showing the adaptation of the circuit of Fig. 1 to the measurement of the output of a thermocouple.

Fig. 6 illustrates the application of the invention to the conversion of a single output voltage. The circuit is shown as connected to receive the output of a thermocouple 50, one terminal 51 of which is grounded and the other terminal 52 connected to resistor 16. The diodes 24 and 26 are shown as forming part of a duplex-diode triode, the triode 53 of which has its control grid connected to the terminal 52 and the modulation voltage applied to its anode. The connection of the control grid in this manner allows the gain of the triode to be utilized to enhance its control effect on the diode 24. Thus an increase of voltage at the terminal 52 will serve to increase the current flow through the triode 53 and thus increase the voltage drop across the resistor 22. This results in improvement of modulation over a wide range of thermocouple voltages. The resonant circuit composed of the primary coil 41 and condenser 43 is tuned to the modulation frequency.

Figure 7:
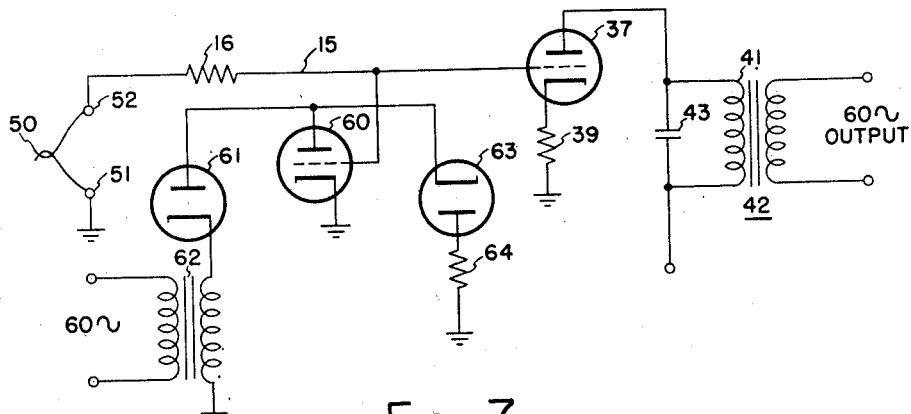
Fig. 7 is a schematic diagram of an arrangement for measuring a single voltage in accordance with the invention.

The circuit of Fig. 7 illustrates another arrangement by which the invention may be employed for the conversion of a single D. C. voltage to an A. C. voltage. The voltage at the terminal 52 of the thermocouple 50 is applied to the control grid of the tube 37 by way of resistor 16 and the lead 15. The junction of the resistor 16 and the control grid of the tube 37 is directly connected to the control grid of a triode 60. The cathode of this tube is grounded. The anode is connected to the anode of a diode 61, the cathode of which is grounded through the secondary of a transformer 62. Modulation voltage is applied to the primary of this transformer. The anode of the tube 60 is also connected to the cathode of a diode 63, the anode of which is grounded through a resistor 64 the resistance of which is the same as that of resistor 16.

In this circuit the connection to the control grid of tube 60 provides a shunt of variable resistivity to the connection between the grid of tube 37 and the thermocouple terminal. The resistivity of this shunt is varied by the application of modulation voltage to the anode of tube 60 by way of diode 61. The diode allows the application only of a negative potential to the anode of tube 60, the positive half-cycles being blocked. This voltage increases the resistivity of the shunt. The diode 63 serves the purpose of providing a leakage path for the negative voltage periodically built-up at the anode of tube 60. The diode 61 blocks current flow to the anode of tube 60 when the upper end of the secondary of transformer 62 is positive.

Figure 8:
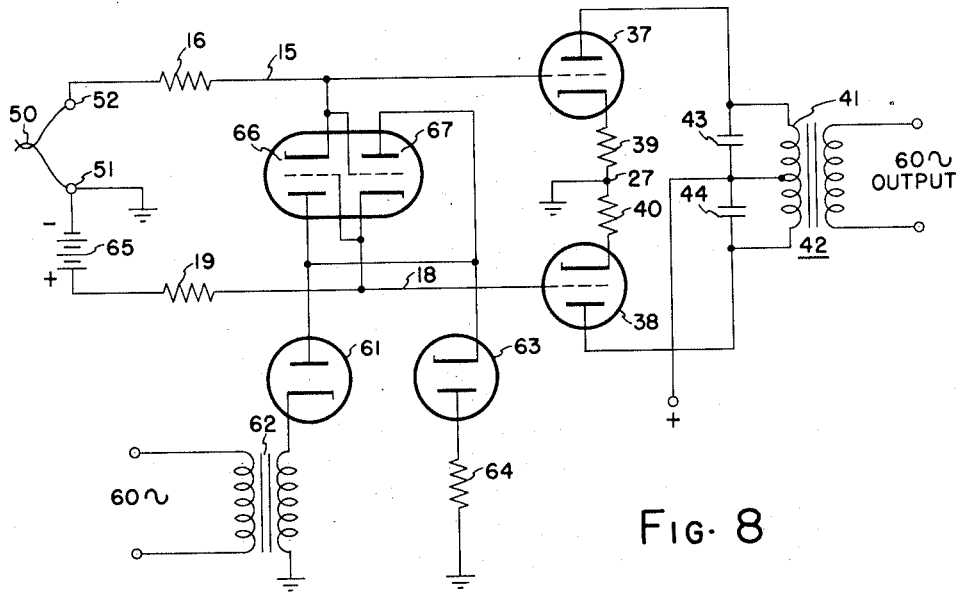
Fig. 8 is a schematic diagram of another arrangement for measuring a single voltage in accordance with the invention.

The circuit of Fig. 8 is also adapted to the conversion of a single D. C. voltage. It opposes the voltage of a terminal 52 which is to be converted, with voltage from a fixed source such as the battery 65. The positive terminal of the battery 65 is connected via resistor 19 and conductor 18 to the control grid of tube 38.

Between the conductors 15 and 18 are connected a pair of triodes 66 and 67. The cathode of tube 66 and the grid of tube 67 are connected to conductor 15. The cathode of tube 67 and the grid of tube 66 are connected to conductor 18. The modulation voltage is applied in the same manner as in Fig. 7, the transformer 62, diodes 61 and 63 and resistor 64 being utilized. The anode of diode 61 is connected to the anodes of tubes 66 and 67 and the cathode of diode 63 is similarly connected.

In the operation of this circuit the application of negative voltage to the anodes of tubes 66 and 67 inhibits space current flow therein and the grids of tubes 37 and 38 are at substantially the potentials of terminal 52 and the positive terminal of the battery 65 respectively. When the upper terminal of the secondary of transformer 62 becomes positive the negative voltage previously applied to the anodes of tubes 66 and 67 leaks off through diode 63 and resistor 64. When this occurs any voltage discrepancy between the conductors 15 and 18 will cause one of the tubes 66 or 67 to conduct, thus virtually short circuiting the control grids of tubes 37 and 38.

Figure 9:
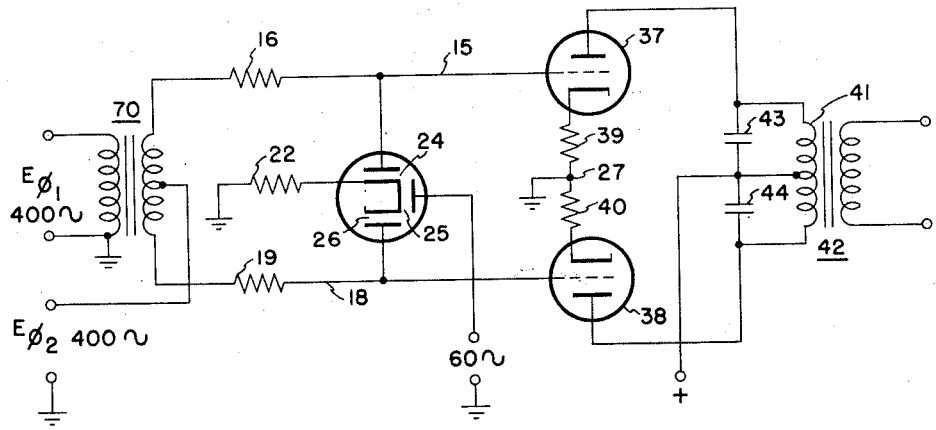
Fig. 9 is a schematic diagram of a circuit utilizing the invention for the measurement of the phase relationship of a pair of voltages.

Fig. 9 illustrates the utilization of the invention for the derivation of an A. C. voltage at the modulating frequency, the magnitude of which is a function of the phase difference of two alternating current input voltages of higher frequency. The circuit is identical with that of Fig. 2 except for the manner of application of the input voltages. Voltage of one phase, indicated as $E\phi_1$ is applied to the primary of a transformer 70. Voltage of the second phase, indicated as $E\phi_2$ is applied to a center tap on the secondary of transformer 70. The frequency of the voltages to be measured should be at least four times that of the modulation voltage. The output of the circuit will be at the frequency of the 60 cycle modulating voltage and the magnitude will be proportional to the difference in phase of the two input voltages. While the input voltages have been indicated as having a frequency of 400 cycles, this is for illustration only, as voltages of any frequency may be compared provided the frequency is at least four times that of the modulation voltage.

It should be understood that the frequency which has been designated for the modulation voltage and the values of the resistors 16 and 19 are given solely by way of example. Any low frequency may be used for modulation purposes and the value of the resistors depends upon the other parameters of the circuit and the magnitude of the applied voltages. The tubes 37 and 38 are not restricted to triodes. These tubes merely act as coupling elements and any tubes capable of performing this function may be used.

What is claimed is:

1. Means for generating an alternating current having an amplitude which is a function of the amplitude of a direct current; said means comprising a source of said direct current, a pair of circuits each having an impedance element presenting a high value of impedance, said values being equal, means applying said direct current to one of said circuits, means applying a reference value of direct current to the other of said circuits, said circuits having a common branch and said direct currents being applied in opposing sense with respect to said common branch, a pair of electron discharge devices each having an anode, a cathode and a control electrode, the control electrode of each of said devices and the cathode of the other being connected together and into a respective one of said circuits, said common branch comprising a connection between each of said anodes and ground, said connections being in parallel, a source of alternating current, a unilateral impedance device in each of said connections, said unilateral impedance devices presenting to the respective anodes impedances of opposite directional sense, means coupling alternating current from said source across one of said unilateral impedance devices, an impedance element connected between the other of said unilateral impedance devices and ground, the last named impedance element having the same value of impedance as the first mentioned impedance elements, and means differentially combining the alternating currents flowing in said circuits.

2. Means for generating an alternating current of specified frequency the amplitude of which is a function of the phase difference between two alternating currents of a higher frequency; said means comprising a source of each of said two alternating currents, a pair of circuit elements having high and equal values of impedance, means applying each of said two alternating currents to a respective one of said elements, means forming a conductive path between each of said circuit elements and ground, means cyclically and synchronously varying the impedance of said paths at said specified frequency and phase sensitive means differentially combining the alternating currents at said circuit elements.

3. Means for generating an alternating current of specified frequency the amplitude of which is a function of the phase difference between two alternating currents of a higher frequency; said means comprising a source of each of said two alternating currents, three electron discharge devices, each comprising an anode and a cathode, means providing a common impedance between the cathodes of said devices and ground, means applying each of said two alternating currents to the anode of a respective one of a pair of said devices, means applying an alternating current having said specified frequency to the anode of the remaining device and phase sensitive means differentially combining the alternating currents at the anodes of said pair of devices.

4. Means for generating an alternating current having an amplitude which is a function of a difference in a characteristic common to a pair of electric currents; said means comprising a pair of circuits each including a source of a respective one of said currents, and an impedance element having a high value of impedance, said values being equal, means forming a conductive return path between each of said elements and the source of its respective circuit, the last named means comprising an electron discharge device the space discharge space of which forms a part of said conductive return path, impedance means common to both of said return paths and connected between an electrode of each of said space discharge devices and said sources, said impedance means having a low value of impedance, a source of cyclically varying voltage and means applying said voltage across the space discharge regions of said electron discharge devices, said applying means being unilaterally conductive, and means coupled to said circuits at said elements and differentially combining the alternating current energy therein.

5. Means for generating an alternating current having an amplitude which is a function of a difference in a characteristic common to a pair of electric currents; said means comprising a source of said currents, a pair of circuit elements having high and equal values of impedance, means applying each of said currents to a respective one of said elements, means forming a conductive return path between each of said elements and the source of the current applied thereto, mean cyclically and synchronously varying the impedance of said conductive paths, said varying means including a source of cyclically varying voltage and unilaterally conductive means coupling said source to said paths, and means sensitive to said characteristic coupled to the energy existing at the junctions of said elements with their respective return paths and differentially combining said energy.

6. Means for generating an alternating current having an amplitude which is a function of the difference in amplitude of a pair of direct currents; said means comprising a source of said direct currents, a pair of circuit elements having high and equal values of impedance, means applying each of said direct currents to a respective one of said elements, means forming a conductive return path from each of said elements to the source of the current applied thereto, a source of alternating current, unilaterally conductive means applying said alternating current from said source to both of said conductive paths to vary the impedance thereof cyclically and synchronously at the frequency of said alternating current, and means differentially combining the alternating currents at said circuit elements.

7. Means for generating an alternating current having an amplitude which is a function of the difference in amplitude of a pair of direct currents; said means comprising a source of said direct currents, a pair of circuit elements having high and equal values of impedance, means applying each of said direct currents to a respective one of said elements, means forming a conductive return path from each of said elements to the source of the current applied thereto, electronic means cyclically varying the impedance of said conductive paths, said electronic means including a source of cyclically varying voltage and unilaterally conductive means coupling said source to said paths, and means differentially combining the alternating currents at said circuit elements.

8. Means for generating an alternating current having an amplitude which is a function of a difference in a characteristic common to a pair of electric currents; said means comprising a source of said pair of electric currents, three electron discharge devices, each comprising an anode and a cathode, the cathodes of said devices having a common impedance to ground, a pair of circuit elements having high and equal values of impedance, means applying each of said electric currents through a respective one of said elements to a respective one of said anodes, a source of alternating current, means applying alternating current from the last named source to the anode of the remaining device, and means sensitive to said characteristic differentially combining the alternating currents at said respective anodes.

9. Means for generating an alternating current having an amplitude which is a function of the difference in amplitude between two direct currents; said means comprising a source of said direct currents, three electron discharge devices each comprising an anode and a cathode, the cathodes of said devices having a common impedance to ground, a pair of circuit elements having high and equal values of impedance, means applying each of said electric currents through a respective one of said elements to a respective one of said anodes, a source of alternating current, means applying alternating current from the last named source to the anode of the remaining device, and means differentially combining the alternating currents at said respective anodes.

10. Means for generating an alternating current having an amplitude which is a function of a difference in a characteristic common to a pair of electric currents; said means comprising a source of said electric currents, a pair of electron discharge devices, each having an anode, a cathode, and a control electrode, means applying each of said electric currents to a respective one of said control electrodes, means forming a conductive return path extending in common from said cathodes to said source, a source of alternating current, means applying to said anodes alternating current from the last named source, and means sensitive to said characteristic differentially combining the alternating currents at said control electrodes.

11. Means for generating an alternating current having an amplitude which is a function of a difference in a characteristic common to a pair of electric currents; said means comprising a pair of electron discharge devices, each having a plurality of electrodes, a source of said pair of electric currents, means applying each of said electric currents to a respective one of a first pair of corresponding electrodes of said devices, means providing a common impedance to ground for a second pair of corresponding electrodes of said devices, a source of cyclically varying voltage, means applying voltage from the last named source across the space discharge regions of said devices whereby the effective resistance between said elements and ground is cyclically and synchronously varied, and means sensitive to said characteristic differentially combining the alternating currents at said first pair of electrodes.

12. Means for generating an alternating current having an amplitude which is a function of the difference in amplitude between two direct currents; said means comprising a source of said direct currents, a pair of circuit elements having high and equal values of impedance, means applying each of said direct currents to a respective one of said elements, means providing a conductive path between each of said elements and ground, a pair of space discharge devices, each of said paths including the space discharge path of a respective one of said electron discharge devices, means cyclically and synchronously varying the effective resistance of said space discharge paths, the last named means comprising a source of cyclically varying voltage and a unilaterally conductive coupling means between said source and said path, and means differentially combining the alternating currents at said circuit elements.

13. Means for generating an alternating current having an amplitude which is a function of a difference in a characteristic common to a pair of electric currents; said means comprising a source of said pair of electric currents, a pair of electron discharge devices each comprising a cathode and an anode, means applying each of said electric currents to a respective one of said anodes, a third electron discharge device having an anode, a cathode and a control electrode, means connecting said control electrode to the cathodes of said pair of devices, a source of alternating current, means applying alternating current from the last named source to the anode circuit of said third device, and means sensitive to said characteristic differentially combining the alternating currents at the anodes of said pair of devices.

14. Means for generating an alternating current having an amplitude which is a function of a difference in a characteristic common to a pair of electric currents; said means comprising a source of said electric currents, a pair of electron discharge devices each having an anode and a cathode, means applying each of said currents to a respective one of said anodes, means connected in common between said cathodes and ground and presenting an impedance to current flow through said devices, means cyclically varying the impedance of the last named means, said varying means comprising a source of cyclically varying voltage and unilaterally conductive means coupling said voltage to said impedance means, and means sensitive to said characteristic differentially combining the alternating currents flowing at said anodes.

JOSEPH T. McNANEY.

References Cited in the file of this patent

UNITED STATES PATENTS

| Number | Name | Date |
|---|---|---|
| 1,428,156 | Espenschied | Sept. 5, 1922 |
| 2,148,718 | Agins | Feb. 28, 1939 |
| 2,493,669 | Gray | Jan. 3, 1950 |
| 2,546,371 | Peterson | Mar. 27, 1951 |
| 2,551,291 | Rich | May 1, 1951 |